United States Patent
Demortier et al.

(10) Patent No.: US 7,647,140 B2
(45) Date of Patent: Jan. 12, 2010

(54) SYSTEM FOR AIDING THE PILOTING OF AN AIRCRAFT DURING THE APPROACH TO A RUNWAY WITH A VIEW TO A LANDING

(75) Inventors: Jean-Pierre Demortier, Maurens (FR); Isabelle Lacaze, Colomiers (FR); Jean-Louis De Menorval, Aussonne (FR)

(73) Assignee: Airbus France, Toulouse (FR)

( * ) Notice: Subject to any disclaimer, the term of this patent is extended or adjusted under 35 U.S.C. 154(b) by 693 days.

(21) Appl. No.: 11/145,951

(22) Filed: Jun. 7, 2005

(65) Prior Publication Data

US 2006/0025901 A1 Feb. 2, 2006

(30) Foreign Application Priority Data

Jun. 17, 2004 (FR) .................................. 04 06563

(51) Int. Cl.
*G06F 19/00* (2006.01)
(52) U.S. Cl. .............................. 701/16; 701/3; 244/183; 340/947; 340/951
(58) Field of Classification Search ...................... 701/3, 701/6; 244/183; 340/947, 951
See application file for complete search history.

(56) References Cited

U.S. PATENT DOCUMENTS 3,666,929 A 5/1972 Menn
3,875,379 A * 4/1975 Vietor .......................... 701/121
4,232,839 A * 11/1980 Sicre et al. ................... 244/188
4,633,404 A 12/1986 Greeson et al.
5,289,185 A * 2/1994 Ramier et al. ................ 340/971
6,317,663 B1 11/2001 Meunier et al.
2002/0036573 A1 * 3/2002 Wyatt .......................... 340/945
2002/0158168 A1 10/2002 Greene

OTHER PUBLICATIONS

Preliminary Search Report dated Dec. 30, 2004.

* cited by examiner

*Primary Examiner*—Mark Hellner
*Assistant Examiner*—Helal A Algahaim
(74) *Attorney, Agent, or Firm*—Dickinson Wright PLLC

(57) ABSTRACT

A system for aiding the piloting of an aircraft during a runway approach includes an information source that provides information relating to the aircraft and its environment. A computation unit determines, with the aid of information provided by the information source, an energy reference profile having a trajectory reference profile and a speed reference profile that allows the aircraft to regain a stabilized approach trajectory, if it follows the reference profile. A monitor verifies that the aircraft is following the reference profile. An indicator supplies the pilot with piloting indications for piloting the aircraft so as to follow the reference profile.

11 Claims, 2 Drawing Sheets

SYSTEM FOR AIDING THE PILOTING OF AN AIRCRAFT DURING THE APPROACH TO A RUNWAY WITH A VIEW TO A LANDING

FIELD OF THE INVENTION

The present invention relates to a system for aiding the piloting of an aircraft, in particular a civil transport plane, during the approach to a runway with a view to a landing.

BACKGROUND OF THE RELATED ART

It is known that around half of aircraft accidents or incidents result from a poorly controlled landing (leaving the runway, overly abrupt touchdown, etc.).

It is known moreover that most of these accidents or incidents could have been avoided with the aid of a stabilized approach, that is to say with a speed and a slope that are stabilized from a first altitude, for example 500 feet (around 150 meters) or 1000 feet (around 300 meters), and this being so down to a second altitude, for example 50 feet (around 15 meters), in direct proximity to the runway.

One of the reasons which leads to an unstabilized approach is poor anticipation on the part of the pilot of the energy to be dissipated in order to regain the ultimate point of stabilization (at said first altitude).

Moreover, other reasons, related in particular to events exterior to the aircraft lead to disturbances of the approach. For example, air traffic control may contribute to unstabilized approaches since, after having supplied indications regarding heading and altitude, air traffic control sometimes leaves the aircraft at a point close to the final approach axis in an energy-related configuration that is not always ideal.

SUMMARY OF THE INVENTION

The present invention is directed at remedying these drawbacks. It relates to a system for aiding the piloting of an aircraft during the approach to a runway with a view to a landing, which allows the pilot to regain a stabilized approach trajectory when this is possible, regardless of its initial configuration (in terms of speed, altitude, aerodynamic configuration, etc.).

For this purpose, according to the invention, said system/of the type comprising:
  information sources able to provide information relating to the aircraft and to its environment;
  a computation unit; and
  means of indication,
is noteworthy in that:
  said computation unit determines, with the aid of information provided by said information sources, an energy reference profile which is intended to allow the aircraft to regain a predetermined approach trajectory, if it follows said reference profile. According to the invention, said computation unit uses, as predetermined approach trajectory, a trajectory allowing the aircraft to carry out a stabilized approach to the runway. Preferably, said energy reference profile comprises a trajectory reference profile and a speed reference profile;
  said system furthermore comprises means of monitoring for verifying that the aircraft is following said reference profile; and
  said means of indication supply the pilot with piloting indications at least to make it possible to pilot said aircraft in such a way that it follows said reference profile.

Thus, by virtue of the invention, the pilot has indications at his disposal allowing him to follow said energy reference profile (preferably a trajectory reference profile and also a speed reference profile), and thus to regain said approach trajectory (relating to a stabilized approach). This mode for regaining said approach trajectory may be implemented regardless of the initial configuration (in terms of speed, altitude, aerodynamic configuration, etc.) of the aircraft. The system in accordance with the invention therefore aids the pilot to manage the total energy of the aircraft to follow said reference profile.

Advantageously, said information sources provide information relating to at least certain of the following data:
  the aerodynamic configuration of the aircraft;
  the position of at least one landing gear;
  the position of airbrakes;
  the geographical position of the aircraft;
  the speed of the aircraft;
  the mass of the aircraft;
  the altitude of the threshold of the runway;
  the characteristics of the wind;
  the exterior temperature; and
  the exterior pressure.

Furthermore, advantageously, said predetermined trajectory exhibits a constant slope between two different predetermined altitudes, the aircraft having to exhibit a predetermined constant speed at least at the higher altitude of said two altitudes so as to be able to carry out a stabilized approach.

In a preferred embodiment, said computation unit determines a reference profile making it possible to regain said approach trajectory as directly as possible, while minimizing consumption and noise, with a slope which is negative or zero.

Furthermore, advantageously:
  in a first embodiment, said computation unit comprises at least one aerodynamic model, a thrust model and a performance model; and
  in a second embodiment, said computation unit comprises a set of predetermined possible solutions, the choice between said predetermined solutions being carried out by an integrated means, for example a neural network.

Additionally, advantageously, said means of indication are able to present on a display screen:
  a characteristic sign indicating the slope to be commanded and a characteristic sign indicating the variation in progress of said slope; and/or
  a characteristic sign indicating the speed to be commanded and a characteristic sign indicating the variation in progress of said speed; and/or
  a characteristic sign indicating the altitude to be commanded and a characteristic sign indicating the variation in progress of said altitude; and/or
  a characteristic sign indicating the energy to be commanded and a characteristic sign indicating the variation in progress of said energy.

Additionally, in a particular embodiment:
  said means of indication are able to present an item of information demanding a go-around, when the landing phase in progress cannot be brought to term; and/or
  said means of indication are able to present information relating to at least certain of the following indications:
    the modification of the aerodynamic configuration of the aircraft;

the extending of airbrakes; and the extending of at least one landing gear.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
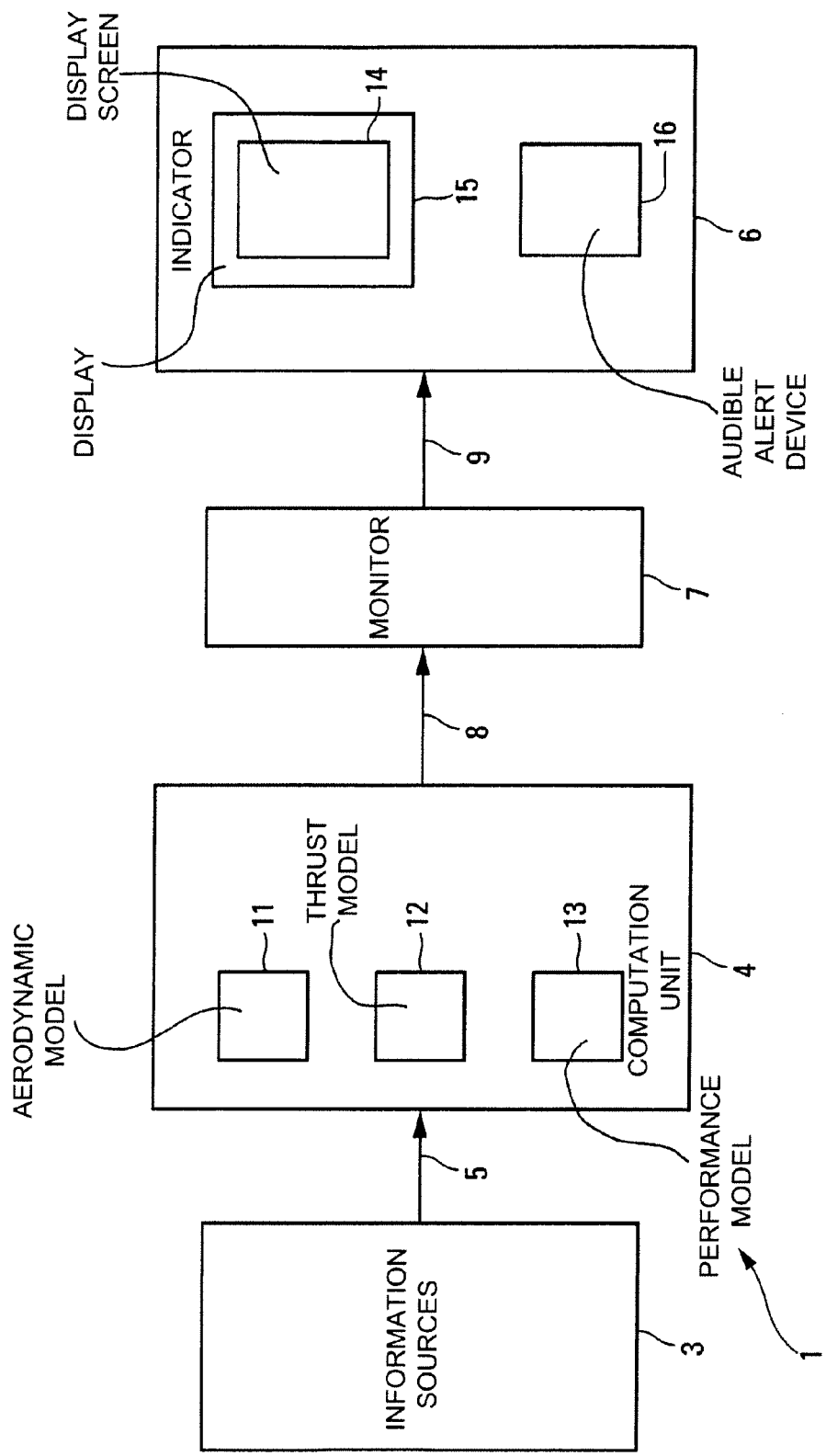
FIG. 1 is the schematic diagram of a system for aiding piloting in accordance with the invention.

The system 1 in accordance with the invention and represented diagrammatically in FIG. 1 is intended to aid the piloting of an aircraft A, in particular a civil transport plane, during the approach to a runway 2, with a view to a landing. To do this, said system 1 is of the type comprising:

information sources 3 which are able to provide information specified hereinbelow, relating to the aircraft A and to its environment;

a computation unit 4 which is connected by a link 5 to said information sources 3; and means of indication 6.

According to the invention:

said computation unit 4 determines, with the aid of information provided by said information sources 3, an energy reference profile PR which preferably comprises a trajectory reference profile PR1 (that is to say a preset trajectory to be followed) and a speed reference profile PR2, (that is to say a preset speed to be complied with, during flight along said preset trajectory) and which is intended to allow the aircraft A to regain a predetermined approach trajectory TO, if it satisfies said reference profile PR (that is to say if it follows said preset trajectory at said preset speed);

said system 1 moreover comprises means of monitoring 7 which are connected by a link 8 to the computation unit 4 and by a link 9 to the means of indication 6, for verifying that the aircraft A does indeed satisfy said reference profile PR; and said means of indication 6 supply the pilot with piloting indications specified hereinbelow, at least to allow him/her to pilot said aircraft A in such a way that it always satisfies said reference profile PR.

Figure 2:
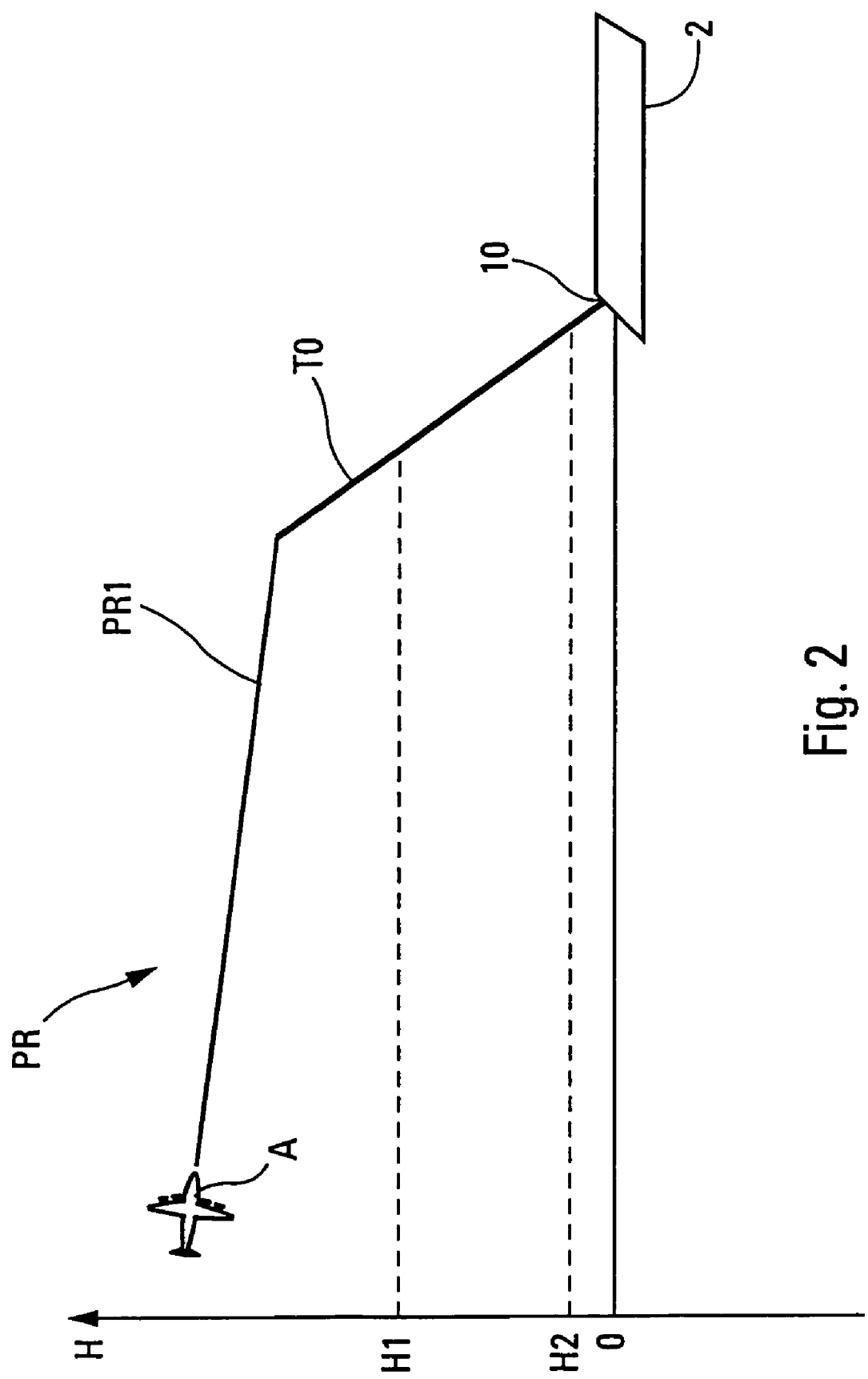
FIG. 2 is a graphic illustrating a trajectory followed by an aircraft furnished with a system for aiding piloting in accordance with the invention.

According to the invention, said computation unit 4 uses, as predetermined approach trajectory TO, a trajectory allowing the aircraft A to carry out a stabilized approach to the runway 2, that is to say with a stabilized speed and stabilized slope:

from a first geographical altitude H1 (or height with respect to the ground), for example 500 feet (around 150 meters) or 1000 feet (around 300 meters); and this being so until a second geographical altitude H2, for example 50 feet (around 15 meters), in proximity to the runway 2, as represented in FIG. 2.

FIG. 2 illustrates the approach to the runway 2 in a vertical plane showing in particular the height H of the aircraft A with respect to the ground.

Thus, by virtue of the system 1 in accordance with the invention, the pilot has at his disposal indications supplied by the means of indication 6 allowing him to follow (satisfy) said reference profile PR (a trajectory reference profile PR1 and also a speed reference profile PR2), and thus to regain said approach trajectory TO (relating to a stabilized approach). This mode for regaining said approach trajectory TO may thus be implemented regardless of the initial configuration (in terms of speed, altitude, aerodynamic configuration, etc.) of the aircraft A. The system 1 in accordance with the invention therefore aids the pilot to manage the total energy of the aircraft A (to follow said reference profile PR).

Additionally, said information sources 3 provide information relating to at least certain of the following data:

data relating to the aircraft A:

the aerodynamic configuration of the aircraft A (that is to say as appropriate the position of slats and of flaps on the wings of the aircraft A);

the position of at least one landing gear of the aircraft A;

the position of airbrakes of the aircraft A;

the geographical position of the aircraft A, giving an item of information in particular with respect to the geographical position of the runway 2;

the speed of the aircraft A;

the mass of the aircraft A;

data relating to the airport:

the altitude of the threshold 10 of the runway 2;

said stabilized approach trajectory TO;

the altitude of interception of the approach trajectory TO, in case of constraints relating to interception;

data relating to the atmospheric conditions:

the characteristics of the wind;

the exterior temperature; and the exterior pressure.

In a preferred embodiment, said computation unit 4 determines a reference profile PR making it possible to regain said approach trajectory TO as directly as possible, while minimizing, if possible, consumption and noise, with a slope which is negative or zero, doing so with a possibility of usign airbrakes.

In a particular embodiment of the invention, the determination of the reference profile PR for regaining the predetermined approach trajectory TO may also take account of altitude constraints related to the relief.

Furthermore:

in a first embodiment, said computation unit 4 comprises at least one aerodynamic model 11, a thrust model 12 and a performance model 13, and implements an appropriate algorithm; and in a second embodiment, said computation unit 4 comprises a set of predetermined possible solutions, the choice between said predetermined solutions being carried out automatically by an appropriate integrated means (not represented), for example a neural network.

Furthermore, said means of indication 6 are able to present on a display screen 14 of a standard means of display 15, for example of a device for displaying primary flight parameters, of a head-up viewfinder or of a navigation screen:

a characteristic sign indicating the slope to be commanded so as to satisfy said reference profile PR and a characteristic sign indicating the variation in progress of said slope; and/or a characteristic sign indicating the speed to be commanded so as to satisfy said reference profile PR and a characteristic sign indicating the variation in progress of said speed; and/or a characteristic sign indicating the altitude to be commanded so as to satisfy said reference profile PR and a characteristic sign indicating the variation in progress of said altitude; and/or a characteristic sign indicating the energy to be commanded so as to satisfy said reference profile PR and a characteristic sign indicating the variation in progress of said energy.

Additionally, in a particular embodiment:

said means of indication 6 are able to present a visual item of information (for example on the display screen 14) and/or audible item of information (for example with the aid of an appropriate audible alert means 16) demanding a go-around, when the landing phase in progress cannot be brought to term; and/or said means of indication 6 are able to present visual information (for example on the display screen 14) and/or audible information (for example with the aid of said audible alert means 16), relating to at least certain of the following indications:

the modification of the aerodynamic configuration of the aircraft A;

the extending of airbrakes of the aircraft A; and the extending of at least one landing gear of the aircraft A.

The invention claimed is:

1. A system for aiding piloting of an aircraft during an approach to a runway with a view to a landing, the approach following a predetermined approach trajectory allowing the aircraft to carry out a stabilized approach to the runway, said system comprising:

an information source that provides information relating to the aircraft and to its environment;

a computation unit; and an indicator, wherein:

said computation unit determines, with the aid of information provided by said information source, an energy reference profile, comprising a trajectory reference profile representing a preset trajectory to be followed and a speed reference profile representing a preset speed to be complied with during flight along said trajectory reference profile, that is configured to enable the aircraft to regain the predetermined approach trajectory, if it follows said energy reference profile, regardless of the initial configuration of the aircraft in terms of speed and altitude;

said system furthermore comprises a monitor for verifying that the aircraft is following said energy reference profile;

said indicator supplies the pilot with piloting indications that are configured to enable at least piloting of said aircraft in such a way that it follows said energy reference profile;

said computation unit uses, as the predetermined approach trajectory, a trajectory that is configured to enable the aircraft to carry out a stabilized approach to the runway; and said predetermined approach trajectory exhibits a constant slope between two different predetermined altitudes, the aircraft having to exhibit a predetermined constant speed at least at the higher altitude of said two altitudes so as to be able to carry out the stabilized approach.

2. The system as claimed in claim 1, wherein said information source provides information relating to at least certain of the following data:

the aerodynamic configuration of the aircraft;

the position of at least one landing gear;

the position of airbrakes;

the geographical position of the aircraft;

the speed of the aircraft;

the mass of the aircraft;

the altitude of the threshold of the runway;

the characteristics of the wind;

the exterior temperature; and the exterior pressure.

3. The system as claimed in claim 1, wherein said computation unit determines an energy reference profile that is configured to enable regaining of said approach trajectory as directly as possible, while minimizing consumption and noise, with a slope which is negative or zero.

4. The system as claimed in claim 1, wherein said computation unit comprises at least one aerodynamic model, a thrust model and a performance model.

5. The system as claimed in claim 1, wherein for determining the energy reference profile, said computation unit makes a choice among a set of predetermined possible solutions, the choice between said predetermined solutions being carried out automatically by an integrated device.

6. The system as claimed in claim 1, wherein said indicator presents, on a display screen, a characteristic sign indicating the slope to be commanded and a characteristic sign indicating the variation in progress of said slope.

7. The system as claimed in claim 1, wherein said indicator presents, on a display screen, a characteristic sign indicating the speed to be commanded and a characteristic sign indicating the variation in progress of said speed.

8. The system as claimed in claim 1, wherein said indicator presents, on a display screen, a characteristic sign indicating the altitude to be commanded and a characteristic sign indicating the variation in progress of said altitude.

9. The system as claimed in claim 1, wherein said indicator presents, on a display screen, a characteristic sign indicating the energy to be commanded and a characteristic sign indicating the variation in progress of said energy.

10. The system as claimed in claim 1, wherein said indicator presents an item of information demanding a go-around when a landing phase in progress cannot be brought to term.

11. The system as claimed in claim 1, wherein said indicator presents information relating to at least certain of the following:

a modification of the aerodynamic configuration of the aircraft;

extending of airbrakes; and extending of at least one landing gear.

* * * * *